May 11, 1965

O. R. SEIDNER 3,182,593

ROCKET VEHICLE WITH AUXILIARY STAGING
STRUCTURE AND COMMON FUEL SUPPLY

Original Filed June 13, 1955

PRESSURE SENSITIVE SWITCH

PRESSURE SENSITIVE SWITCH

INVENTOR.
Orville R. Seidner

United States Patent Office 3,182,593
Patented May 11, 1965

3,182,593
ROCKET VEHICLE WITH AUXILIARY STAGING STRUCTURE AND COMMON FUEL SUPPLY
Orville R. Seidner, Alhambra, Calif., assignor to The Garrett Corporation, Los Angeles, Calif., a corporation of California
Original application June 13, 1955, Ser. No. 515,183, now Patent No. 2,962,934. Divided and this application Dec. 1, 1960, Ser. No. 73,022
8 Claims. (Cl. 102—49)

This invention relates to vehicle propulsion in general, and particularly relates to propulsion apparatus adaptable to vehicles of the rocket type.

This application is a division of application Serial No. 515,183, filed June 13, 1955 for: Vehicle Propulsion Apparatus, now Patent No. 2,962,934.

Rocket propulsion is divided into three broad phases: (1) getting the rocket off the ground and on its way, (2) accelerating the rocket through the dense atmosphere in the lower altitudes, and (3) propelling the rocket thereafter. Since the rocket customarily must carry its own fuel for all three phases, it is readily seen that the success of the third phase is governed almost solely by the economics effected in the first and second phases.

In the prior art it has been customary to provide liquid fuel and oxidant tanks within the rocket vehicle to supply the fuel nozzles in the motor thereof. Since a considerable portion of the fuel is consumed in the first and second phases above-mentioned, it is readily seen that any economies that can be effected in those phases will have beneficial effects on the range or payload of the rocket because the fuel thus saved is then available for the third and most important phase.

In order to effect such economies it has been proposed to add a booster or plurality of booster (commonly known as rocket steps or booster stages) to the payload rocket to lift the payload and accelerate it through the dense air in the lower reaches of the atmosphere. For example, it is stated in Rockets, Missiles, and Space Travel, by Willy Ley, published by The Viking Press, in 1952, that the "WAC-Corporal" in solo flight (with a booster) attained an altitude of about 43.5 miles and the "V-2" rocket attained a solo altitude of 114 miles, but when the WAC-Corporal was staged by the V-2 it reached 250 miles altitude. Of particular note is the fact that the V-2 required about 4½ tons (dry weight) plus about 10 tons of fuel to stage the WAC-Corporal. Of the dry weight mentioned the rocket motor weighed one ton approximately.

Obviously, the dry weight of the booster step constitutes a penalty since it represents, in effect, a "deadhead passenger" taken along for the ride.

I have discovered means for decreasing the dry weight of the booster or auxiliary step of a rocket vehicle. I have also discovered means for providing starting assist to a single step rocket. Both discoveries are based upon the principle that a rocket motor is ignorant of and not particular about the source of the fuel fed to it, and that auxiliary means may be provided for furnishing external fuel either to the rocket motor nozzle or to nozzle means apart from the included motor nozzle to furnish thrust to the motor, hence to the rocket vehicle.

Therefore, the present invention is concerned with the first and second phases of rocket propulsion. Primarily, the invention has for its object the provision of methods and means for providing an auxiliary boost in the launching of a rocket whereby the fuel usually expended in getting the rocket off the ground is conserved for use in the later phases. Another object is to provide auxiliary assist propulsion apparatus which will allow conservation of the fuel in a rocket during the first and second phases of its flight. Other more specific objects will be apparent at once upon a consideration of the drawings when examined in the light of the description which follows.

In rocket motors an intense heat is generated in the combustion chamber by the burning fuel. It has been suggested that the combustion chamber, the throat, and the motor exhaust nozzle could be protected to some extent by providing a jacket around them to provide an intermediate space through which the fuel or oxidant could be conducted, in heat exchange, upstream from the fuel or oxidant nozzles. Patent No. 2,695,496 shows such a structure.

Figure 1:
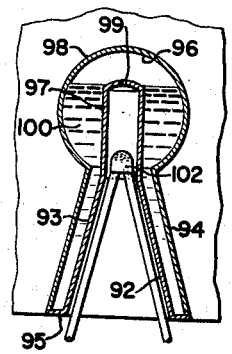
FIG. 1 is a cross-sectional view of one form of rocket motor, showing a method of protecting the combustion chamber and throat of the motor.
Figure 3:
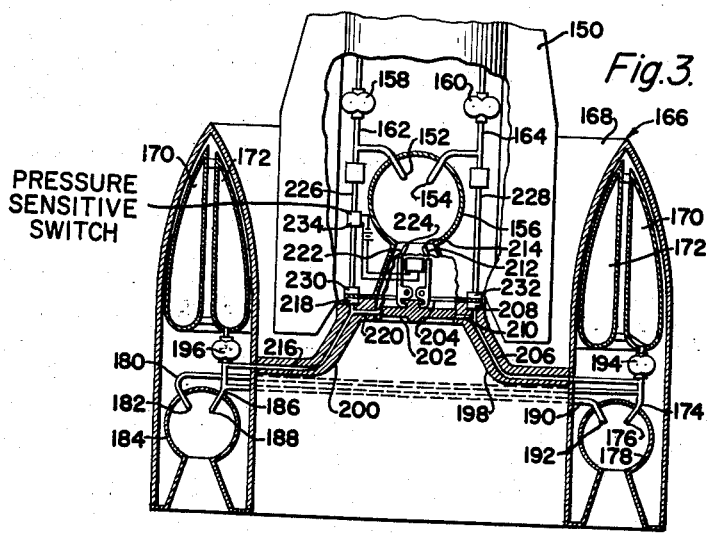
FIG. 3 is an elevation view, partly in cross-section, of an embodiment of the invention as applied to a free flight rocket.
Figure 4:
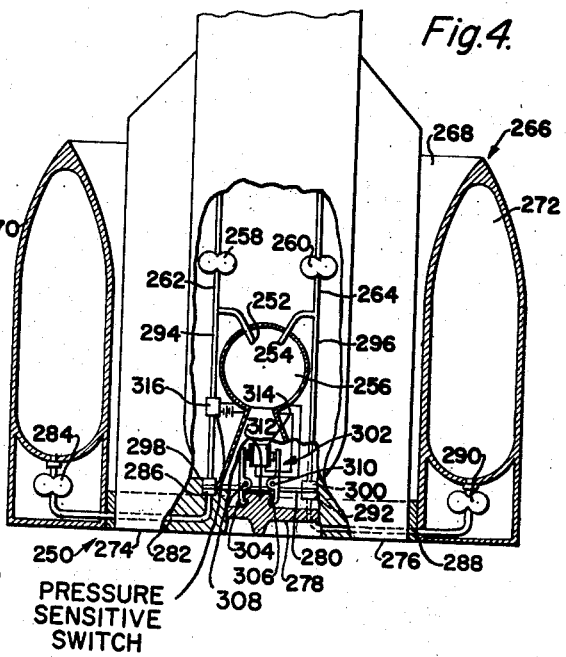
FIG. 4 is an elevation view, partly in cross-section, of an alternate embodiment of the invention as applied to a free flight rocket.

In the practice of the present invention, as depicted by FIGS. 3 and 4, it is evident that no protective heat transfer will take place. Therefore, it is proposed, as shown in FIG. 1, to provide an expendable liner 92 within the exhaust nozzle 94 and the combustion chamber 96 of the motor 98. The liner 92 comprises a wall portion 93 shaped generally in the form of a frustum to conform to the configuration of the exhaust nozzle 94 of the motor 98. The annular flanged portion 95, extending radially from the larger open end of the frustum portion 93, is adapted to engage and form a seal with the inner wall of the exhaust nozzle 94 adjacent the lower end of the motor 98. The upper end of the wall 93 is substantially closed by a capped cylindrical portion 97 which extends upwardly from the smaller end of the frustum, the capped end being provided with an orifice 99 for equalization of pressures on each side of the liner 92. A shown, the cylindrical portion extends well into the combustion chamber 96 of the motor 98. The liner may be fabricated of lead, for example, or any other material which is readily disintegrated by the heat in the motor 98 when it is being fired.

The space 100 between the liner 92 and the inner walls of the motor 98 constitutes a jacketed chamber which may be nearly filled, for example, with water which will be converted to steam upon ignition of the fuel and oxidant issuing from the fuel nozzle 102. As the heat builds up in the combustion chamber the liner 92 melts or crumbles, according to the nature of the expendable material from which it is fabricated, with a portion of the heat being utilized to convert the water to steam and to melt the liner. In that manner the combustion chamber and throat are protected during the initial buildup of thrust from the combustion of the fuel.

Figure 2:
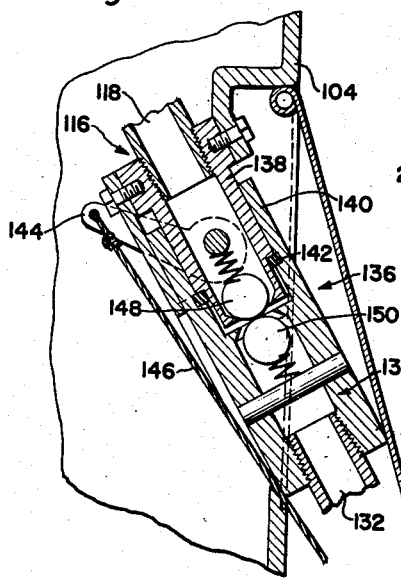
FIG. 2 is an enlarged cross-section fragmentary view of a fuel-line coupling which may be employed with the rocket of FIG. 3.

In FIG. 2 there is shown an enlarged cross-section fragmentary view of a fuel-line coupling, such as disclosed in Patent No. 2,533,640, which may be utilized with the propulsion apparatus as shown in FIG. 3. The coupling member 116 comprises a male nipple 138 secured to the hull of the rocket and disposed at an acute angle to the vertical axis thereof. The member 134 comprises a mating female body 140 adapted to have a sliding fit with the nipple 138 and to be secured thereto with the gasket seal 142 interposed, as shown. The securing means is adequately shown and described in the aforesaid Patent No. 2,533,640 and need not be repeated herein. The securing means includes a locking and unlocking lever 144 arranged to be locked manually in the position shown and to be unlocked, for quick disconnect, by a pull on the cord 146. The distal end of the cord may be connected to the structure 166 shown in FIG. 3 with the parts so arranged that a predetermined pull, occasioned by the inertia of structure 166 at the completion of one phase of flight by the rocket vehicle, will cause the handle 144 to be drawn downwardly, thereby effecting disconnect between the members 116 and 134.

It will be appreciated that disconnect provision must be made for both fuel and oxidant, since these two liquids are obviously not carried within a single conduit. Therefore, it is contemplated that the coupling device 136 will, in reality, comprise a pair of adjacent couplers, each including a male nipple and female body, and each being releasable by concurrent unlocking actuation.

A feature of the coupling is the ball check 148 which prevents fuel from being pumped back through the pipe 118, for example, and the ball check 150 which closes off the external supply when the disconnect is accomplished.

FIGS. 3 and 4 show embodiments of the invention applied to auxiliary staging structures adapted to accompany the rocket vehicle during the first two phases of its flight. It is a feature of these embodiments that propulsion of the rocket is accomplished primarily by thrust generated in its own motor. The embodiment of FIG. 3 includes rocket motors in the auxiliary staging structure for the preferred purpose of merely causing the structure to accompany the rocket until the external fuel tanks are exhausted. With that type of construction, the auxiliary motors need not be as large and heavy as would be the case if they were to contribute any substantial thrust to the rocket. In the embodiment of FIG. 4 the main rocket motor is utilized for all thrust purposes, including that of lifting the auxiliary staging booster and causing it to accompany the rocket until the external tanks are empty.

Referring now to FIG. 3, there is shown the lower motor section 150 of a rocket adapted to have the fuel and oxidant nozzles 152 and 154 of its motor 156 fed by pumps 158 and 160 through the pipes 162 and 164 from the tanks in the rocket (not shown). An auxiliary staging structure 166 comprises an annular shell 168 enclosing a pair of annular tanks 170 and 172 which are adapted to constitute the external source of fuel and oxidant. Preferably, the tanks are paired as shown and extend completely around and within the nose of the shell 168. Such an arrangement provides proper correlation (with respect to the axis of the rocket) between the probably different quantities of fuel and oxidant carried and between their differing rates of consumption in flight.

Tank 170 has a connection by means of the pipe 174 with the nozzle 176 in the rocket motor 178, and a connection by means of the pipe 180 with the nozzle 182 in the rocket motor 184. Similarly, the tank 172 has a connection by means of the pipe 186 with the nozzle 188 in the motor 184, and a connection by way of the pipe 190 with the nozzle 192 in the motor 178. Pumps 194 and 196 are arranged to feed the fuel and oxidant from the tanks 170 and 172 to the pipes 174, 180 and pipes 186, 190.

Extending inwardly from the shell 168 are a pair of arms or struts 198 and 200 provided at their inner ends with an annulus 202 arranged to abut the end surface 204 of the rocket section 150. Arm 198 is provided with a passageway 206 which communicates at one end with the pump 194 and at the other end with a coupling element 208. The passageway 206 has a lateral branch 210 to the end of which is secured the pipe 212 which feeds a fluid nozzle 214 extending within the exhaust nozzle of the motor 156.

Arm 200 is provided with a passageway 216 which communicates at one end with the pump 196 and at the other end with a coupling element 218. The passageway 216 has a lateral branch 220 to the end of which is secured the pipe 222 which feeds a fluid nozzle 224 extending within the exhaust nozzle of the motor 156.

Arranged within the rocket are the pipes 226 and 228 providing communication between the rocket motor fuel and oxidant nozzles 152, 154 and the coupling elements 218, 208 by way of the mating coupling elements 230, 232 which are secured in the base of the motor section 150 adjacent the end surface 204.

The paired coupling elements 218, 230 and 208, 232 may be of similar construction to those shown at 138, 140 in FIG. 2, or of any other preferred type.

Shutoff or check valves of suitable type are contemplated for the various fluid lines to prevent undue pressure on the lightweight tanks in the rocket and to prevent fuel and oxidant from being pumped overboard when the rocket steps part. One innovation might be a pressure sensitive switch 234 arranged to activate the pumps 158, 160 upon cessation of pressure in pipe 226 upon exhaustion of auxiliary tank 172. All other details of pipes, valves, and plumbing are clearly within the skill of the rocket artisan.

It is now seen that the external source of fuel and oxidant in the tanks 170 and 172 is available at the nozzles 152, 154, 214, and 224 for thrust in the main rocket motor 156, and at the nozzles 176, 192, 182, and 188 for thrust in the auxiliary motors 178 and 184. It will be understood, of course, that while there is shown a pair of auxiliary motors 178 and 184, any number may be employed.

In FIG. 4 there is depicted a structure similar in many respects to that of FIG. 3. The lower motor section 250 of the rocket is adapted to have the fuel and oxidant nozzles 252 and 254 of its motor 256 fed by the pumps 258 and 260 through the pipes 262 and 264 from the tanks in the rocket (not shown). An auxiliary staging structure 266 comprises an annular shell 268 enclosing a pair of tanks 270 and 272. In the construction shown the tanks would be semiannular, i.e., each would extend approximately half way around within the shell 268. The construction is not critical, and the tanks could be annular, if desired, after the manner shown in FIG. 3.

Extending inwardly from the shell 268 (and disposed intermediate the rocket fins) are a pair of arms or struts 274 and 276 joined at their inner ends by a ring or annulus 278 arranged to abut the end surface 280 of the rocket section 250. Arm 274 is provided with a passageway 282 which communicates at one end with the pump 284 and at the other end with a coupling element 286. Arm 276 is provided with a passageway 288 which communicates at one end with the pump 290 and at the other end with a coupling element 292.

Arranged within the rocket are the pipes 294 and 296 providing communication between the rocket motor fuel and oxidant nozzles 252, 254 and the coupling elements 286, 292 by way of the mating coupling elements 298, 300 which are secured in the base of the motor section 250 adjacent the end surface 280. The paired coupling elements 286, 298 and 292, 300 are similar to those described above in connection with FIG. 3 and need not be further detailed here.

The staging structure 266 is arranged to accompany the rocket. To this end a plurality of releasable latches, one being shown at 302, are arranged around the base of the motor section and the annulus 278 intermediate the struts 274 and 276. For the purpose of illustration only, the latch 302 is shown in a cut-away sectional view in FIG. 4 as comprising a pair of dogs 304 and 306 pivotally secured to the motor section 250 by means of the pins 308 and 310, respectively. The latching ends of the dogs are arranged to engage the outwardly extending shoulders of the annulus portion 312 which extends upwardly from the annulus 278. Unlatching action of the dogs is accomplished by the solenoid 314 which, when energized, causes the dog members to pivot about the pins 308 and 310 whereupon the latching ends of the dogs are disengaged from the outwardly extending shoulders of the annulus portion 312.

Means for energizing the solenoid 314 to accomplish the aforementioned unlatching action may include a pressure sensitive switch 316 subject to the pressure in the auxiliary fluid feed pipe 294. Thus, when the fluid in the tank 270 is exhausted, the lowered pressure in the conduit 294 actuates the switch 316 to close an electrical circuit, as shown schematically in FIG. 4, and thereby energize the solenoid 314. The electrical circuit forms no part of the present invention since it could be easily devised by a skilled technician.

It will be appreciated, of course, that the latch details may be changed according to any preferred design, and that the form shown is merely for the purpose of illustration, as aforementioned. Furthermore, the latch structure shown in FIG. 4 may be incorporated in the embodiment shown in FIG. 3 and operated by the pressure sensitive switch 234.

In the practice of the invention as shown in FIGS. 3 and 4, the rocket is fired in the usual manner but with fuel and oxidant being supplied from the external tanks in the auxiliary staging structures. When the fluid is exhausted in the external tanks, the pressure switches in the auxiliary feed lines are actuated to close their respective circuits. In both cases, the pressure switches may be arranged to energize the main fuel pumps in the rocket. Additionally, the pressure sensitive switch 234 in FIG. 3 energizes the solenoid of the latch structure and the pressure switch 316 in the embodiment shown in FIG. 4 energizes the solenoid 314 to unlatch the auxiliary staging booster from the rocket. If desired, fuel and oxidant may be supplied to all the rocket motors from tanks (not shown) within the rocket vehicle.

It will now be seen that the invention comprises, in its broadest general aspects, means for providing sources of liquid fuel and oxidant for the propulsion of a vehicle. Additionally, novel means for introducing the fuel and oxidant to the thrust region of a rocket motor have been disclosed without any intent to limit the invention to the mere details which have been described.

What is claimed is:

1. Propulsion apparatus for a rocket vehicle comprising: a primary thrust producing rocket motor; an auxiliary staging structure; a plurality of auxiliary thrust producing rocket motors mounted within said auxiliary staging structure; means coupling said auxiliary staging structure to said rocket vehicle; means for uncoupling said auxiliary staging structure from said rocket vehicle at the completion of one phase of flight by said rocket vehicle; means within said rocket vehicle for supplying fuel and oxidant to said primary rocket motor; and common means within said auxiliary staging structure for supplying fuel and oxidant selectively to said primary and auxiliary rocket motors.

2. Propulsion apparatus for a rocket vehicle comprising: a primary thrust producing rocket motor, an auxiliary staging structure; a plurality of auxiliary thrust producing rocket motors mounted within said auxiliary staging structure; means coupling said auxiliary staging structure to said rocket vehicle; means for uncoupling said auxiliary staging structure from said rocket vehicle at the completion of one phase of flight by said rocket vehicle; means within said rocket vehicle for supplying fuel and oxidant to said primary and auxiliary rocket motors; and common means within said auxiliary staging structure for supplying fuel and oxidant to said rocket motors.

3. Propulsion apparatus for a rocket vehicle comprising: a primary thrust producing rocket motor; an auxiliary staging structure; a plurality of auxiliary thrust producing rocket motors mounted within said auxiliary staging structure; means coupling said auxiliary staging structure to said rocket vehicle; means for uncoupling said auxiliary staging structure from said rocket vehicle at the completion of one phase of flight by said rocket vehicle; means within said rocket vehicle for supplying fuel and oxidant to said rocket motors; and means for supplying fuel and oxidant to said rocket motors from a common source within said auxiliary staging structure, said last mentioned means supplying fuel and oxidant to said primary rocket motor and to said auxiliary rocket motors for the first phase of flight by said rocket vehicle.

4. Propulsion apparatus for a rocket vehicle comprising: a primary thrust producing rocket motor, an auxiliary staging structure; a plurality of auxiliary thrust producing rocket motors mounted within said auxiliary staging structure; means coupling said auxiliary staging structure to said rocket vehicle; means for uncoupling said auxiliary staging structure from said rocket vehicle at the completion of one phase of flight by said rocket vehicle; a first means for supplying fuel and oxidant to said primary rocket motor; a second means for supplying fuel and oxidant to said primary rocket motor, said second means supplying fuel and oxidant from a common source within said auxiliary staging structure to said primary rocket motor and to said auxiliary rocket motors prior to the uncoupling of said auxiliary staging structure from said rocket vehicle; and means for altering the supply of fuel and oxidant to said primary rocket motor from said second means to said first means upon exhaustion of fuel and oxidant in said second means.

5. Propulsion apparatus for a rocket vehicle in accordance with claim 4 wherein said means for altering the supply of fuel and oxidant includes pressure sensitive switch means responsive to fuel supply pressure, and means actuated by said pressure sensitive switch for supplying fuel and oxidant to said primary rocket motor from said first means of supply.

6. Propulsion apparatus for a rocket vehicle comprising: a primary thrust producing rocket motor; an auxiliary staging structure; a plurality of auxiliary thrust producing rocket motors mounted within said auxiliary staging structure; means coupling said auxiliary staging structure to said rocket vehicle; means for effecting a separation of said auxiliary staging structure from said rocket vehicle at the completion of one phase of flight by said rocket vehicle; means within said rocket vehicle for supplying fuel and oxidant to said primary rocket motor; and common means within said auxiliary staging structure for supplying fuel and oxidant to said primary and auxiliary rocket motors.

7. Propulsion apparatus for a rocket vehicle comprising: a primary thrust producing rocket motor; an auxiliary staging structure; a plurality of auxiliary thrust producing rocket motors mounted within said auxiliary staging structure; means coupling said auxiliary staging structure to said rocket vehicle; means for uncoupling said auxiliary staging structure from said rocket vehicle at the completion of one phase of flight by said rocket vehicle; and, means within said rocket vehicle for supplying fuel and oxidant from a common source to said primary rocket motor and to said auxiliary rocket motors.

8. Propulsion apparatus for a rocket vehicle comprising; a primary thrust producing rocket motor; an auxiliary staging structure; means within said auxiliary staging structure for supplying fuel and oxidant to said primary rocket motor during one phase of flight by said rocket vehicle; means for coupling said auxiliary staging structure to said rocket vehicle; pressure sensitive switch means responsive to fuel pressure supplied to said primary thrust producing rocket motor; and means actuated by said pressure sensitive switch means for disconnecting said coupling means.

References Cited by the Examiner

UNITED STATES PATENTS

| | | | |
|---|---|---|---|
| 2,447,200 | 8/48 | Miller | 60—35.6 |
| 2,654,320 | 10/53 | Schmid | 102—49 |
| 2,686,473 | 8/54 | Vogel | 102—49 |
| 2,699,036 | 1/55 | Nicholson | 60—35.6 |
| 2,726,510 | 12/55 | Goddard | 60—35.6 |
| 2,735,263 | 2/56 | Charshafian | 60—35.6 |
| 2,745,347 | 5/56 | Lightbody et al. | 102—49 |
| 2,787,218 | 4/57 | Anthony | 102—49 |

BENJAMIN A. BORCHELT, *Primary Examiner.*

SAMUEL FEINBERG, ARTHUR M. HORTON,
*Examiners.*